US009064332B2

(12) United States Patent
Hermosillo Valadez et al.

(10) Patent No.: US 9,064,332 B2
(45) Date of Patent: Jun. 23, 2015

(54) FUSED-IMAGE VISUALIZATION FOR SURGERY EVALUATION

(71) Applicants: Gerardo Hermosillo Valadez, West Chester, PA (US); Xiang Sean Zhou, Exton, PA (US); Gerhard Kleinszig, Forchheim (DE); Rainer Graumann, Höchstadt (DE)

(72) Inventors: Gerardo Hermosillo Valadez, West Chester, PA (US); Xiang Sean Zhou, Exton, PA (US); Gerhard Kleinszig, Forchheim (DE); Rainer Graumann, Höchstadt (DE)

(73) Assignees: Siemens Medical Solutions USA, Inc., Malvern, PA (US); Siemens Aktiengesellschaft, Munich (DE)

( * ) Notice: Subject to any disclaimer, the term of this patent is extended or adjusted under 35 U.S.C. 154(b) by 141 days.

(21) Appl. No.: 14/017,344

(22) Filed: Sep. 4, 2013

(65) Prior Publication Data
US 2014/0003700 A1 Jan. 2, 2014

Related U.S. Application Data

(63) Continuation-in-part of application No. 13/737,987, filed on Jan. 10, 2013.

(60) Provisional application No. 61/697,338, filed on Sep. 6, 2012, provisional application No. 61/585,797, filed on Jan. 12, 2012.

(51) Int. Cl.
*G06K 9/00* (2006.01)
*G06T 11/00* (2006.01)
*G06T 7/00* (2006.01)

(52) U.S. Cl.
CPC ............. *G06T 11/003* (2013.01); *G06T 7/0014* (2013.01); *G06T 2207/30008* (2013.01)

(58) Field of Classification Search
USPC ................................................ 382/128–134
See application file for complete search history.

(56) References Cited

U.S. PATENT DOCUMENTS

| 5,638,458 | A | * | 6/1997 | Giger et al. | 382/132 |
|---|---|---|---|---|---|
| 5,809,170 | A | * | 9/1998 | Saito | 382/203 |
| 6,263,097 | B1 | * | 7/2001 | Dewaele | 382/132 |
| 2003/0149947 | A1 | * | 8/2003 | Sarig | 716/4 |
| 2004/0240753 | A1 | * | 12/2004 | Hu et al. | 382/286 |
| 2005/0113680 | A1 | * | 5/2005 | Ikeda et al. | 600/425 |
| 2006/0159321 | A1 | * | 7/2006 | Takeo et al. | 382/128 |
| 2007/0092126 | A1 | * | 4/2007 | Fang et al. | 382/131 |
| 2008/0183323 | A1 | * | 7/2008 | Menadeva et al. | 700/109 |
| 2008/0292214 | A1 | * | 11/2008 | Vomweg et al. | 382/294 |
| 2009/0087067 | A1 | * | 4/2009 | Khorasani | 382/132 |
| 2011/0214279 | A1 | * | 9/2011 | Park et al. | 29/592 |
| 2013/0325431 | A1 | * | 12/2013 | See et al. | 703/11 |
| 2014/0003700 | A1 | * | 1/2014 | Hermosillo Valadez et al. | 382/131 |
| 2015/0009209 | A1 | * | 1/2015 | Shin et al. | 345/419 |
| 2015/0055825 | A1 | * | 2/2015 | Hasegawa | 382/103 |

* cited by examiner

*Primary Examiner* — Alex Liew
(74) *Attorney, Agent, or Firm* — Peter R. Withstandley

(57) ABSTRACT

Disclosed herein is a framework for facilitating fused-image visualization for surgery evaluation. In accordance with one aspect of the framework, at least one pre-operative image and at least one intra-operative image of an anatomical structure are received. A region of interest may be identified in the intra-operative image. The pre-operative image may be straightened, and a symmetric region may be identified in the straightened pre-operative image. The symmetric region is substantially symmetrical to a target region in the straightened pre-operative region. The target region corresponds to the region of interest in the intra-operative image. The symmetric region may be extracted and reflected to generate a reference image. The intra-operative image may be rigidly registered with the reference image to generate registered intra-operative image, which is overlaid on the target region in the straightened pre-operative image to generate a fused image.

20 Claims, 11 Drawing Sheets

FUSED-IMAGE VISUALIZATION FOR SURGERY EVALUATION

CROSS-REFERENCE TO RELATED APPLICATIONS

This application claims the benefit of U.S. provisional application No. 61/697,338 filed Sep. 6, 2013, the entire contents of which are incorporated herein by reference.

This application is also a continuation-in-part of co-pending U.S. patent application Ser. No. 13/737,987 filed Jan. 10, 2013 entitled "Symmetry-based Visualization for Enhancing Anomaly Detection," which claims the benefit of U.S. provisional application No. 61/585,797 filed Jan. 12, 2012, all of which are hereby fully incorporated herein by reference.

TECHNICAL FIELD

The present disclosure generally relates to diagnostic imaging and, more specifically, to automated or semi-automated systems and methods for facilitating visualization for surgery evaluation based on fused images.

BACKGROUND

The field of medical imaging has seen significant advances since the time X-Rays were first used to determine anatomical abnormalities. Medical imaging hardware has progressed in the form of newer machines such as Medical Resonance Imaging (MRI) scanners, Computed Axial Tomography (CAT) scanners, etc. Because of large amount of image data generated by such modern medical scanners, there has been and remains a need for developing image processing techniques that can automate some or all of the processes to determine the presence of anatomical abnormalities in scanned medical images.

Recognizing anatomical structures within digitized medical images presents multiple challenges. For example, a first concern relates to the accuracy of recognition of anatomical structures within an image. A second area of concern is the speed of recognition. Because medical images are an aid for a doctor to diagnose a disease or condition, the speed with which an image can be processed and structures within that image recognized can be of utmost importance to the doctor in reaching an early diagnosis. Hence, there is a need for improving recognition techniques that provide accurate and fast recognition of anatomical structures and possible abnormalities in medical images.

Digital medical images are constructed using raw image data obtained from a scanner, for example, a CAT scanner, an MRI, etc. Digital medical images are typically either a two-dimensional ("2-D") image made of pixel elements or a three-dimensional ("3-D") image made of volume elements ("voxels"). Such 2-D or 3-D images are processed using medical image recognition techniques to determine the presence of anatomical abnormalities such as cysts, tumors, polyps, etc. Given the amount of image data generated by any given image scan, it is preferable that an automatic technique should point out anatomical features in the selected regions of an image to a doctor for further diagnosis of any disease or condition.

Automatic image processing and recognition of structures within a medical image is generally referred to as Computer-Aided Detection (CAD). A CAD system can process medical images and identify anatomical structures. CAD systems are often used to aid visual inspection by surgeons to verify the results of their interventions (e.g., reconstructive surgery). State-of-the-art image acquisition tools allow them to quickly capture a two-dimensional (2-D) computed tomographic (CT) image of the region of interest during and right after surgery using advanced C-arm scanners. However, such images typically cover only a very small field of view (FOV) and are very noisy in nature, which make it difficult for surgeons to interpret them to determine, for example, orientation of the images with respect to the captured anatomy. The various structures being imaged are only partially covered in the small FOV, and there is ambiguity as to which parts of the image represent these various structures.

Therefore, there exists a need to improve visualization to facilitate evaluation of surgical results.

SUMMARY

The present disclosure relates to a framework for facilitating visualization for surgery evaluation. In accordance with one aspect of the framework, at least one pre-operative image and at least one intra-operative image of an anatomical structure are received. A region of interest may be identified in the intra-operative image. The pre-operative image may be straightened, and a symmetric region may be identified in the straightened pre-operative image. The symmetric region is substantially symmetrical to a target region in the straightened pre-operative region. The target region corresponds to the region of interest in the intra-operative image. The symmetric region may be extracted and reflected to generate a reference image. The intra-operative image may be rigidly registered with the reference image to generate registered intra-operative image, which is then overlaid on the target region in the straightened pre-operative image to generate a fused image.

This summary is provided to introduce a selection of concepts in a simplified form that are further described below in the following detailed description. It is not intended to identify features or essential features of the claimed subject matter, nor is it intended that it be used to limit the scope of the claimed subject matter. Furthermore, the claimed subject matter is not limited to implementations that solve any or all disadvantages noted in any part of this disclosure.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings. Furthermore, it should be noted that the same numbers are used throughout the drawings to reference like elements and features.

DETAILED DESCRIPTION

Figure 1:
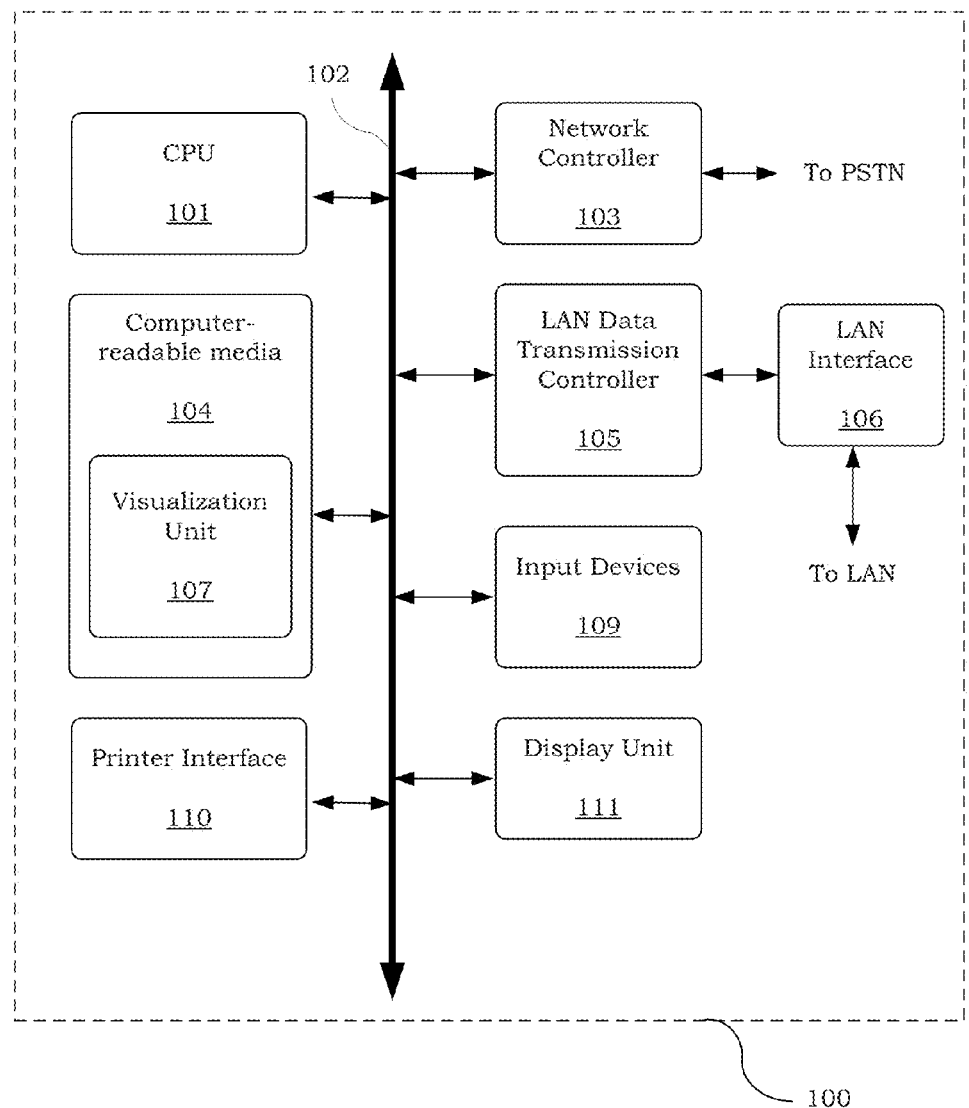
FIG. 1 shows an exemplary computer system.

In the following description, numerous specific details are set forth such as examples of specific components, devices, methods, etc., in order to provide a thorough understanding of embodiments of the present invention. It will be apparent, however, to one skilled in the art that these specific details need not be employed to practice embodiments of the present invention. In other instances, well-known materials or methods have not been described in detail in order to avoid unnecessarily obscuring embodiments of the present invention. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

The term "x-ray image" as used herein may mean a visible x-ray image (e.g., displayed on a video screen) or a digital representation of an x-ray image (e.g., a file corresponding to the pixel output of an x-ray detector). The term "in-treatment x-ray image" as used herein may refer to images captured at any point in time during a treatment delivery phase of a radiosurgery or radiotherapy procedure, which may include times when the radiation source is either on or off. From time to time, for convenience of description, CT imaging data may be used herein as an exemplary imaging modality. It will be appreciated, however, that data from any type of imaging modality including, but not limited to, X-Ray radiographs, MRI, CT, PET (positron emission tomography), PET-CT, SPECT, SPECT-CT, MR-PET, 3D ultrasound images or the like may also be used in various embodiments of the invention.

Unless stated otherwise as apparent from the following discussion, it will be appreciated that terms such as "segmenting," "generating," "registering," "determining," "aligning," "positioning," "processing," "computing," "selecting," "estimating," "detecting," "tracking" or the like may refer to the actions and processes of a computer system, or similar electronic computing device, that manipulates and transforms data represented as physical (e.g., electronic) quantities within the computer system's registers and memories into other data similarly represented as physical quantities within the computer system's memories or registers or other such information storage, transmission or display devices. Embodiments of the methods described herein may be implemented using computer software. If written in a programming language conforming to a recognized standard, sequences of instructions designed to implement the methods can be compiled for execution on a variety of hardware platforms and for interface to a variety of operating systems. In addition, embodiments of the present invention are not described with reference to any particular programming language. It will be appreciated that a variety of programming languages may be used to implement embodiments of the present invention.

As used herein, the term "image" refers to multi-dimensional data composed of discrete image elements (e.g., pixels for 2-D images and voxels for 3-D images). The image may be, for example, a medical image of a subject collected by computed tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R or $R^7$, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of two or three mutually orthogonal axes. The terms "digital" and "digitized" as used herein will refer to images or volumes, as appropriate, in a digital or digitized format acquired via a digital acquisition system or via conversion from an analog image.

A framework for providing visualization for surgery evaluation is described herein. More particularly, the present framework provides a fused-image visualization approach to facilitate surgeons or other users in evaluating results of surgical interventions, such as reconstructive surgery to fix anomalies or problems with an anatomical structure (e.g., hip, femur, joint, etc.). There are several specific needs that the present framework addresses. These needs may be described in the form of questions that a surgeon or other users may have.

One aspect of the present framework addresses the questions: "Where am I?" or "What is what?" As discussed previously, due to noise and small field of view (FOV), intra-operative or post-operative images (collectively referred to as "intra-operative images" herein) are often difficult to interpret in terms of, for instance, its orientation with respect to the anatomy. This is because the various structures that are imaged in the intra-operative image are only very partially captured in the small FOV, and it is ambiguous as to which parts of the image represent these various structures. To address these questions, the present framework automatically fuses the intra-operative image to a target region in a pre-operative image with a larger FOV by using a symmetry-based rigid registration method. The pre-operative image provides the contextual information to help identify the structures in the intra-operative image.

Another aspect of the present framework addresses the question: "How did I do?" The answer to this question provides information about the quality of the surgical intervention. For example, in the case of orthopedic reconstruction, surgical results may be evaluated by determining whether the reconstructed structure or bone is correctly angled (e.g., right angles), shaped, oriented and/or positioned within the anchoring anatomical structure.

To address this question, the present framework may provide various means to answer it in several ways. First, the framework may automatically align and fuse the intra-operative image to the target region in a pre-operative image to allow the surgeon to compare the alignment of the neighboring bones before and during (or after) intervention. Second, in the case of surgery performed on one side of a substantially symmetric anatomical structure (e.g., hip), the framework may automatically align and fuse the intra-operative image to a symmetric region in the pre-operative image. The symmetric region is presumably the "healthy" side of the anatomical structure and is symmetrical to the target region within which intervention is to be performed. By fusing the intra-operative image to the symmetric region in the pre-operative image, the surgeon can visually detect any problems with the intervention. Third, the framework may continuously and alternately display flipped and non-flipped views of a pre-operative image that has been "straightened." This provides a visual aid that advantageously allows the surgeon to compare both sides of the anatomical structure that has been imaged prior to the surgical intervention.

Yet another aspect of the present framework addresses the question: "Is there anything abnormal with the particular anatomy of this patient?" Using automatic registration techniques, the present framework is capable of comparing both the "healthy" side and the target region (or region of interest) of the anatomical structure to a large database of reference anatomies. This allows automatic measurement of angles, distances, and comparison with the values stored in the reference database. It can also provide information of any significant differences determined based on such measurements. These exemplary advantages and features will be described in more details in the following description.

For purposes of illustration, the surgical interventions described herein are those of orthopedic surgeons. However, the present framework is applicable to all types of surgical intervention where the success and results of the intervention may be evaluated by visual inspection of images. In addition, the present framework may be applied to visualizing many types of anatomical structures that exhibit some form of geometric symmetry, such as repetitive structures (e.g., ribs, vertebra bodies, femur, etc.), elongated structures (e.g., bones, blood vessels, vascular system, airways, etc.), organs (e.g., brain, lungs, etc.) and so forth, as well as anomalies or diseases associated with such anatomical structures. Even further, the present framework can be applied to image data acquired by one or more different imaging modalities including, but not limited to, magnetic resonance (MR) imaging, computed tomography (CT), helical CT, x-ray, positron emission tomography (PET), PET-CT, fluoroscopic, ultrasound, single-photon emission computed tomography (SPECT), SPECT-CT, MR-PET, etc.

FIG. 1 shows an exemplary computer system for implementing a method and system of the present disclosure. The computer system referred to generally as system 100 may include, inter alia, a central processing unit (CPU) 101, computer-readable media 104, a printer interface 110, a display unit 111, a local area network (LAN) data transmission controller 105, a LAN interface 106, a network controller 103, an internal bus 102, and one or more input devices 109, for example, a keyboard, mouse, touch screen, etc. Computer system 100 may further include support circuits such as a cache, a power supply, clock circuits and a communications bus. Various other peripheral devices, such as additional data storage devices and printing devices, may also be connected to the computer system 100.

The present technology may be implemented in various forms of hardware, software, firmware, special purpose processors, or a combination thereof, either as part of the microinstruction code or as part of an application program or software product, or a combination thereof, which is executed via the operating system. In one implementation, the techniques described herein are implemented as computer-readable program code tangibly embodied in non-transitory computer-readable media 104. In particular, the present techniques may be implemented by visualization unit 107. Non-transitory computer-readable media 104 may include random access memory (RAM), read only memory (ROM), magnetic floppy disk, flash memory, and other types of memories, or a combination thereof. The computer-readable program code is executed by CPU 101 to process and display images (e.g., pre-operative and post-operative images) acquired by an imaging device (e.g., C-arm, CT scanner). The images may be stored in Digital Imaging and Communications in Medicine (DICOM) format or any other digital file format.

The computer system 100 is a general-purpose computer system that becomes a specific-purpose computer system when executing the computer-readable program code. The computer-readable program code is not intended to be limited to any particular programming language and implementation thereof. It will be appreciated that a variety of programming languages and coding thereof may be used to implement the teachings of the disclosure contained herein.

The same or different computer-readable media 104 may be used for storing a knowledge base, individual patient data, database of previously treated patients (e.g., training data), and so forth. The patient records, including associated image data, may be stored in external storage or other memories. The external storage may be implemented using a database management system (DBMS) managed by the CPU 101 and residing on a memory, such as a hard disk, RAM, or removable media. The external storage may be implemented on one or more additional computer systems. For example, the external storage may include a data warehouse system residing on a separate computer system, a picture archiving and communication system (PACS), or any other now known or later developed hospital, medical institution, medical office, testing facility, pharmacy or other medical patient record storage system.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present framework provided herein, one of ordinary skill in the related art will be able to contemplate these and similar implementations or configurations of the present framework.

Figure 2:
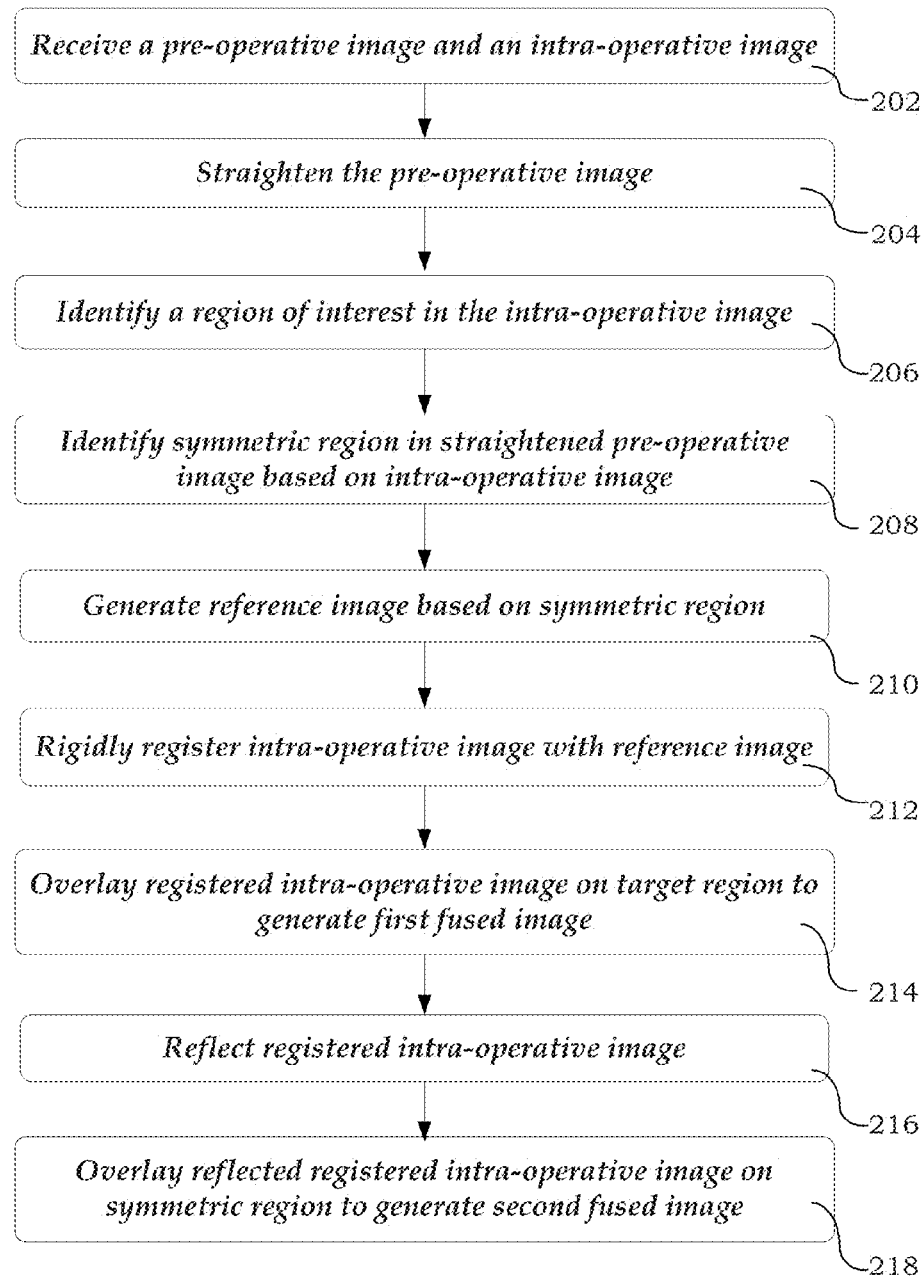
FIG. 2 shows an exemplary method of visualization.

FIG. 2 shows an exemplary method 200 of visualization. It should be noted that the steps of the method 200 may be performed in the order shown or a different order. Furthermore, different, additional or fewer steps may be implemented. Even further, the method 200 may be implemented with the system 100 of FIG. 1, a different system, or a combination thereof.

As shown in FIG. 2, at 202, system 100 receives a pre-operative image and an intra-operative image. A pre-operative image is a medical image of a subject's anatomical structure acquired in advance or prior to a surgical intervention or procedure performed on the anatomical structure. The anatomical structure may be, for example, the hip, pelvis, rib, or any other structure that exhibits some substantial form of geometric symmetry. The pre-operative image may be extracted from volumetric image data, such as computed tomographic (CT) scan data acquired by a CT scanner. Non CT-based imaging systems or other imaging modalities may also be used. In addition, the pre-operative image may have a relatively large field-of-view (FOV) (e.g., more than 160 degrees) for capturing a substantial portion of the anatomical structure.

Figure 3:
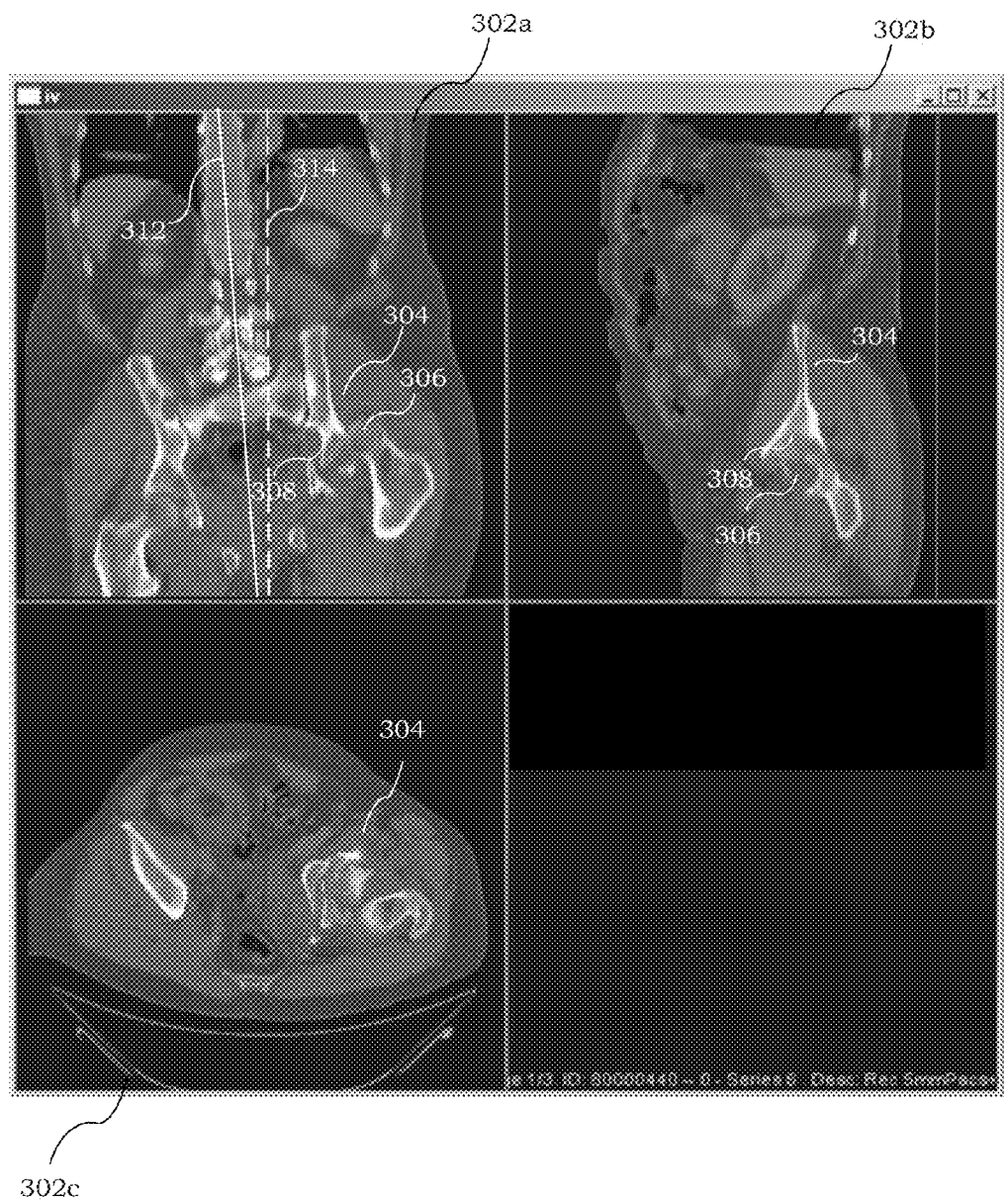
FIG. 3 shows a set of three exemplary pre-operative CT images.

FIG. 3 shows a set of three exemplary pre-operative CT images 302a-c. The pre-operative images 302a-c may represent different views of the same anatomical structure, and are extracted from the same volumetric CT image data. As shown, the first pre-operative image 302a shows a coronal view of the subject's hip region 304, while the second and third pre-operative images (302b and 302c) show a sagittal view and an axial view respectively of the same subject's hip region 304. The hip region 304 shows a dislocation of the femur head 306 resulting from a fracture in the acetabulum 308.

An intra-operative image, on the other hand, is a medical image of the same subject's anatomical structure acquired during or after a surgical intervention or procedure is performed on the anatomical structure. The intra-operative image captures a local region of interest of the subject's anatomical structure that is undergoing or has undergone surgical intervention. The intra-operative image may be, for example, a low-dose two-dimensional image with a relatively narrow FOV and more noise compared to the pre-operative image. In some implementations, the intra-operative image is a CT image acquired by a C-arm system. Non C-arm based imaging systems or other imaging modalities may also be used.

Figure 4:
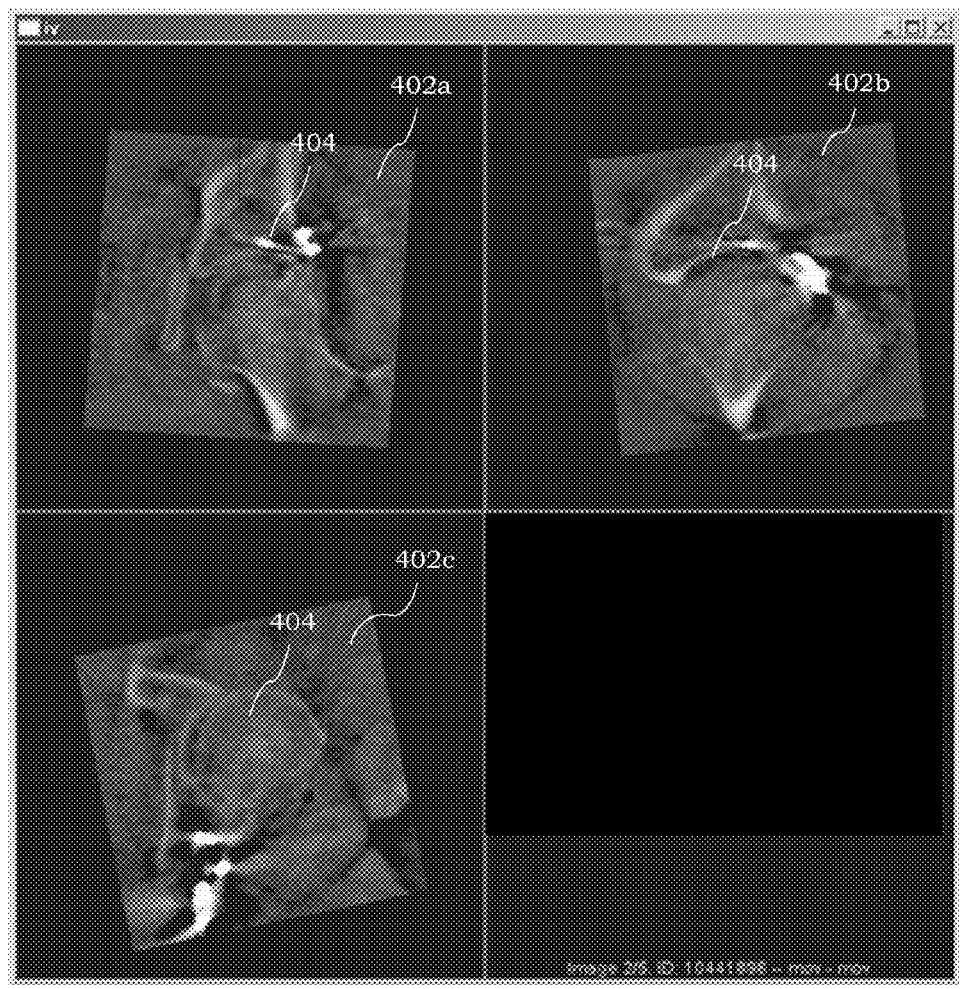
FIG. 4 shows a set of three exemplary intra-operative images.

FIG. 4 shows a set of three exemplary intra-operative images 402a-c. The intra-operative images 402a-c capture the same subject's femoral joint 404 that is undergoing or has undergone surgical intervention, and may be extracted from the same volumetric CT image data. Corresponding to the pre-operative images 302a-c, the intra-operative images 402a-c show coronal, sagittal and axial views respectively of the subject's femoral joint 404.

Referring back to FIG. 2, at 204, the system 100 performs straightening of the pre-operative image. The term "straightening" generally refers to bringing the image into "alignment with itself" to maximize symmetry. In other words, an ideal plane (or line) of symmetry in the image is aligned with the image plane (or line) of symmetry. The image plane (or line) of symmetry, as used herein, is any convenient plane (or line) that may be, for instance, a vertical plane (or line) defined at mid-point with reference to the x-axis of a three-dimensional coordinate system of the pre-operative image. The ideal plane (or line) of symmetry (e.g., mid-sagittal plane) is the plane (or line) with respect to which the anatomical structure in the pre-operative image exhibits maximum symmetry. In other words, there exist first and second regions in the pre-operative image that are substantially symmetric about the ideal plane (or line) of symmetry.

It should be noted that the ideal plane of symmetry is often not aligned with the image plane of symmetry, particularly when the subject's body is not perfectly positioned during image acquisition. For example, as shown in FIG. 3, the ideal plane of symmetry 312 is not in line with the image plane of symmetry 314, as the patient's hip may be slightly rotated or distorted due to trauma.

Figure 5:
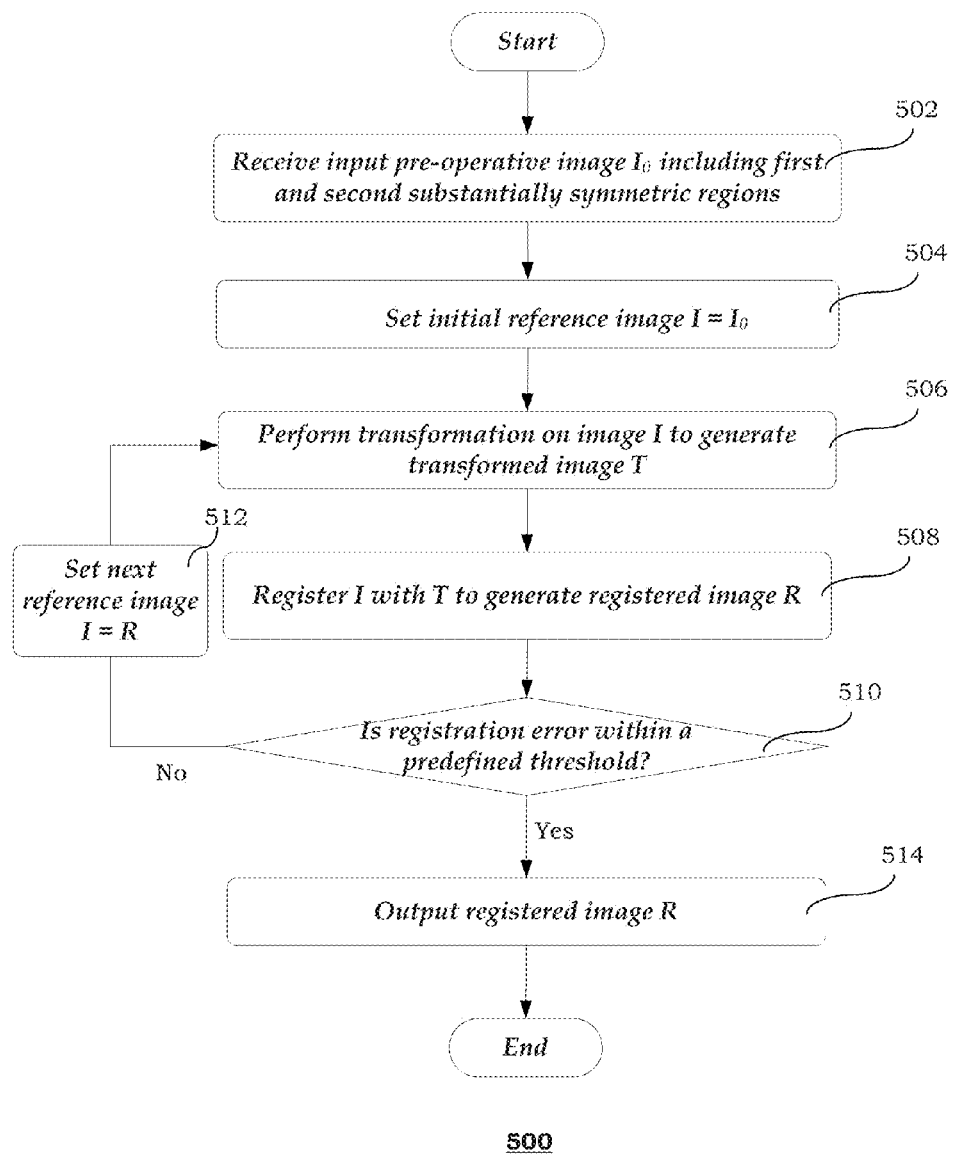
FIGS. 5-6 illustrate an exemplary method of straightening the pre-operative image.
Figure 6:
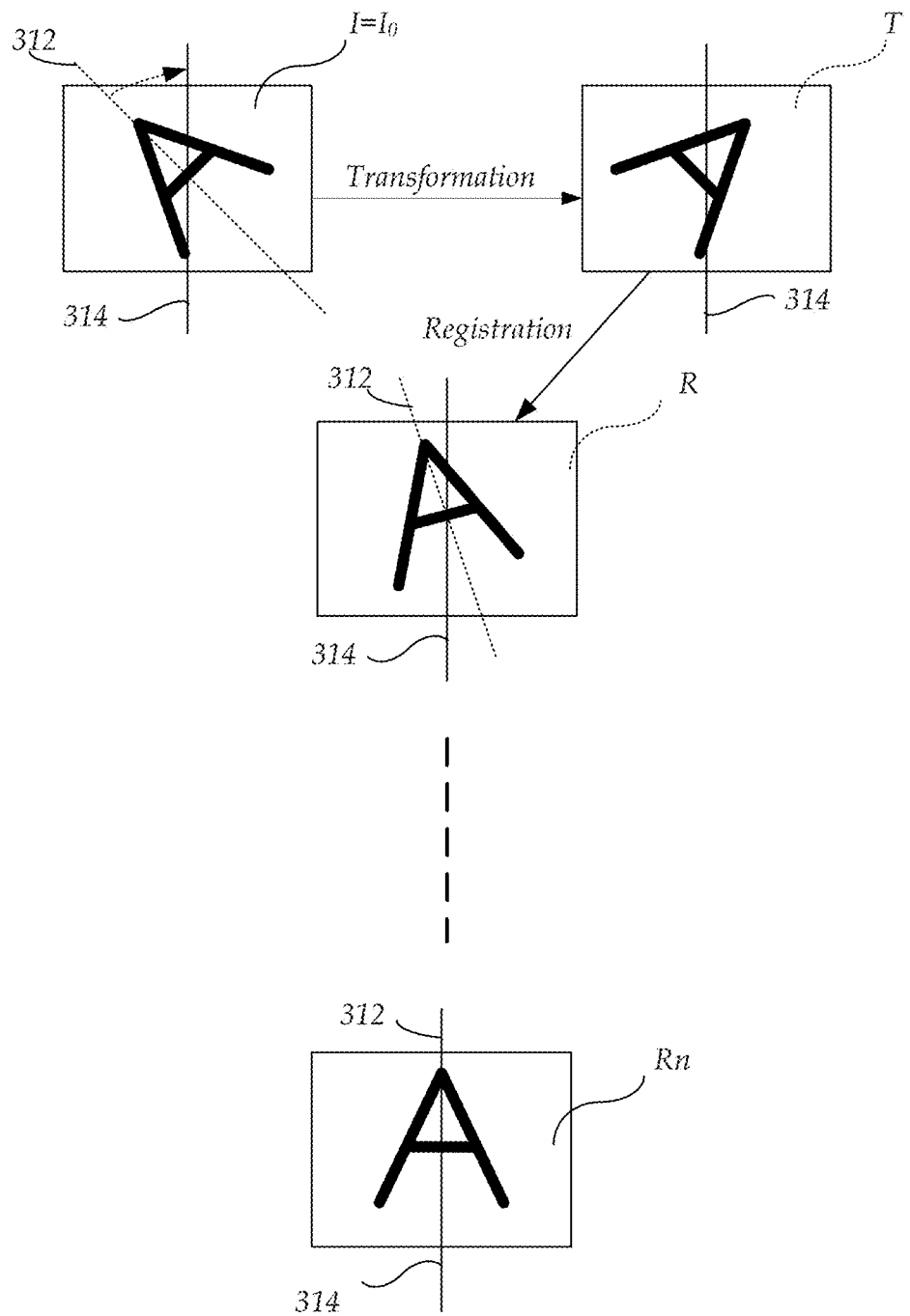

FIGS. 5-6 illustrate an exemplary method 500 of straightening the pre-operative image. The method 500 automatically searches for an optimally symmetric configuration by iteratively performing a series of transformations and robust registrations that align the ideal plane (or line) of symmetry with the image plane (or line) of symmetry. The registration is generally "robust" as it treats any anomaly (e.g., dislocated femur) in the image as an outlier while the rest of the "healthy" or normal anatomy in the image is straightened.

At 502, an input pre-operative image $I_0$ including first and second substantially symmetric regions is received. As discussed previously the ideal plane of symmetry in the image $I_0$ may not coincide with the image plane of symmetry (e.g., mid-plane of the image). At 504, the initial reference image I is set to the input image $I_0$. At 506, a transformation is performed on the initial reference image I to generate a transformed image T. In one implementation, the transformation includes a reflection (or flip) across the image plane of symmetry.

At 508, the initial reference image I is registered with the transformed image T to generate a registered image R. Various types of registration, such as rigid, non-rigid (or deformable), or articulated rigid registration techniques, may be applied. Registering the transformed image T with the initial reference image I effectively aligns the ideal plane of symmetry closer to the image plane of symmetry.

FIG. 6 illustrates the effect of the transformation and registration steps. As shown, the initial reference image I includes a structure with an ideal plane of symmetry 312 that is misaligned with the image plane of symmetry 314. A reflection across the image plane of symmetry 314 is performed to generate the transformed image T. By registering the initial reference image I against the transformed image T, the ideal plane of symmetry 312 is rotated closer to the image plane of symmetry 314.

Turning back to FIG. 5, at 510, a registration error is determined. The registration error indicates the amount of change introduced by the registration. Such registration error may be determined by, for example, measuring the mean or maximum difference between the initial reference image I and the registered image R. If the registration error is not within a predefined threshold (e.g., substantially zero), at 512, the next reference image I is set to the registered image R. Steps 506-510 may be repeated until the registration error is within the predefined threshold. If the registration error is within the predefined threshold, the registered image R with the optimally symmetric configuration is output at 514. FIG. 6 shows an exemplary registered image Rn after convergence is achieved. As shown, the ideal plane of symmetry 312 is substantially aligned with the image plane of symmetry 314.

Figure 7:
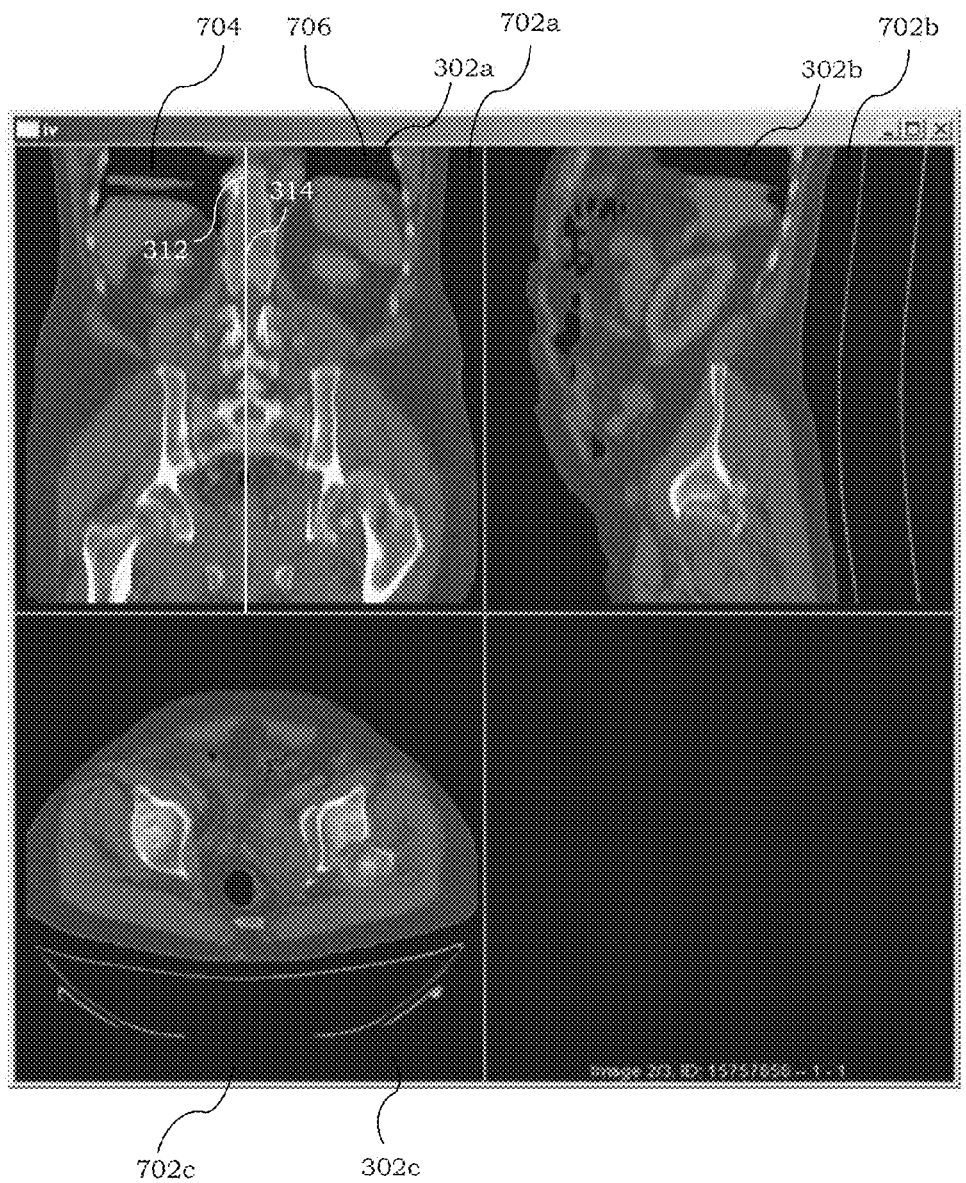
FIG. 7 shows exemplary straightened pre-operative images.

FIG. 7 shows exemplary straightened pre-operative images 302a-c. In image 302a, the ideal plane of symmetry 312 is substantially aligned with the image plane of symmetry 314. Images 302b-c show the corresponding sagittal view and axial view respectively of the pre-operative image data after straightening has been performed.

In some implementations, flipped and non-flipped views of the straightened pre-operative image are alternately displayed so as to generate a "flashing" visualization of any pre-operative asymmetries. To generate the flipped view of the pre-operative image, a similarity transformation is performed on the image. The similarity transformation may include, for example, a reflection (or flip) operation over the image plane of symmetry. Other types of geometric transformations (e.g., scaling, translation, rotation, etc.) may also be applied. For example, in the case of rotational symmetry, the transformation may include a rotation about a point or axis of symmetry.

The transformed (or flipped) pre-operative image may be continuously and alternately displayed with the original non-transformed (or non-flipped) image within a display area (hereinafter "alternate display area"). For example, in FIG. 7, the coronal view of the flipped image and the original non-flipped pre-operative image 302a may be continuously and alternately displayed within the display area 702a. Similarly, the sagittal and axial views of the flipped image and the original non-flipped pre-operative image 302b-c may be continuously and alternately displayed within the respective display areas 702b-c.

Such alternate displaying of flipped and non-flipped pre-operative images results in a flickering or flashing pattern of any differences, even subtle ones, between first and second regions (704 and 706) about the image plane of symmetry 314. The differences may arise due to the presence of one or more anomalies within either the first region 704 or the second region 706. The flashing pattern provides a visual aid for comparing both sides of the anatomical structure, and allows the surgeon or user to easily form a mental picture of the quality of symmetry.

Returning to FIG. 2, at 206, the system 100 automatically identifies a region of interest in the intra-operative image. Pattern recognition techniques may be used to automatically identify the region of interest (e.g., left hip) in the intra-operative image. Such pattern recognition techniques may include, for example, unsupervised, semi-supervised or supervised machine learning procedures for assigning a label to the region of interest. Other types of techniques may also be implemented.

Figure 8:
FIG. 8 shows exemplary pre-operative images where respective target regions have been identified.

At 208, the system 100 automatically identifies a symmetric region in the straightened pre-operative image based on the intra-operative image. As discussed previously, the pre-operative image generally has a larger FOV than the intra-operative image. The symmetric region is presumably the "healthy" region (i.e. free of abnormalities). The symmetric region is substantially symmetrical, about the image plane (or line) of symmetry, to a target region in the straightened pre-operative image. The target region is the focal area where the surgical intervention is to be performed, and it corresponds to the local region of interest captured by the intra-operative image. FIG. 8 shows exemplary pre-operative images 302a-c where respective target regions 802a-c have been identified.

In some implementations, the target region is automatically identified by landmarking techniques. For instance, the landmarking technique may use anatomical knowledge to search the pre-operative image for features containing landmarks corresponding to the region of interest (e.g., left hip). The landmarking technique may further identify the symmetric region by using anatomical knowledge to locate features containing landmarks corresponding to a region (e.g., right hip) that is substantially symmetrical to the target region.

At 210, the system 100 generates a reference image based on the symmetric region. The reference image advantageously serves as a positioning reference for robust alignment of the intra-operative image in a subsequent step 212. The reference image may be generated by extracting the symmetric region from the pre-operative image and reflecting the extracted symmetric region about the image plane (or line) of symmetry.

Figure 9:
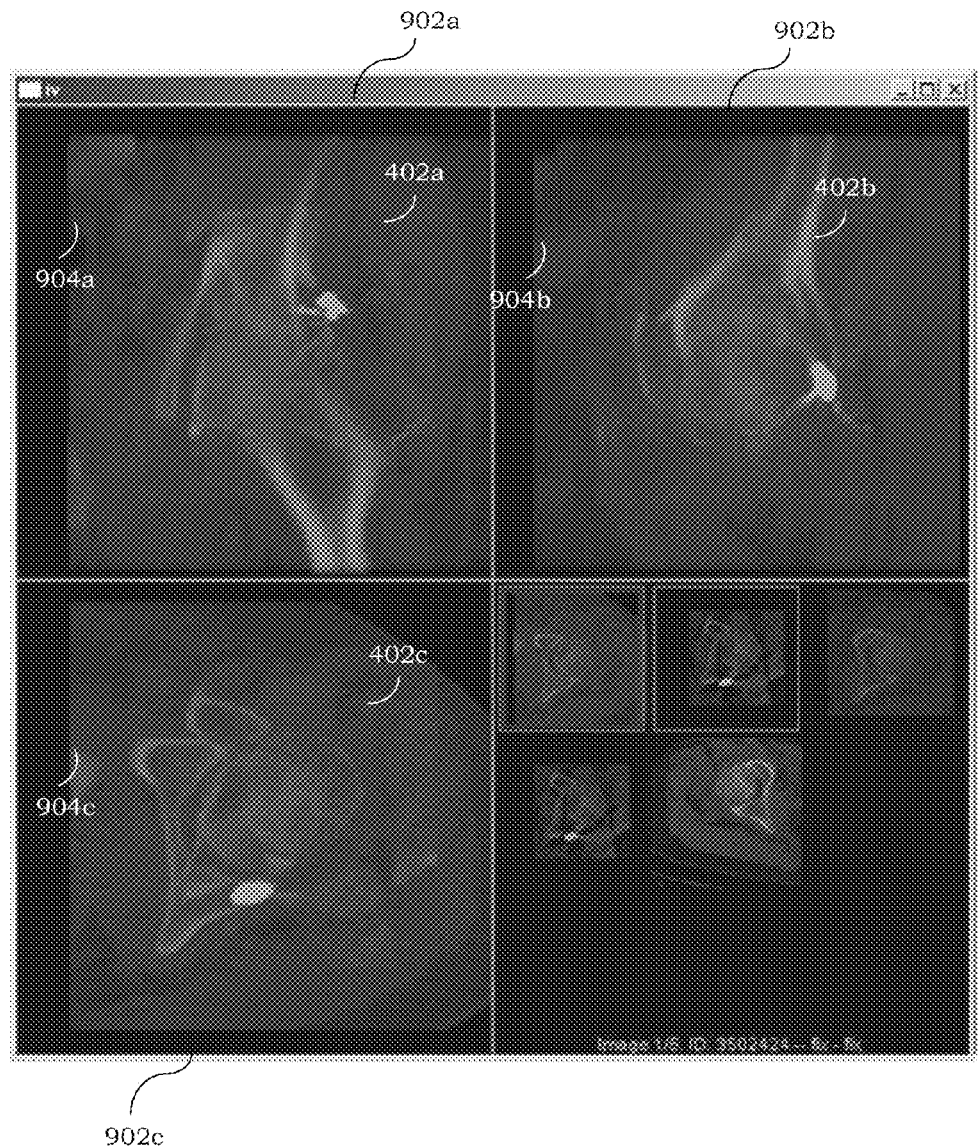
FIG. 9 shows exemplary registered intra-operative images.

At 212, the system 100 rigidly registers the intra-operative image with the reference image to generate a registered intra-operative image. The rigid registration may be performed by, for instance, a linear transformation (e.g., rotation, scaling, translation, or other affine transformation) of the intra-operative image to align it with the target region in the pre-operative image. FIG. 9 shows exemplary registered intra-operative images 902a-c. More particularly, as the intra-operative images 402a-c are registered with their respective reference images 904a-c to generate respective registered intra-operative images 902a-c, the anatomical structure in the intra-operative images 402a-c becomes better aligned with the anatomical structure in the reference images 904a-c.

Figure 10:
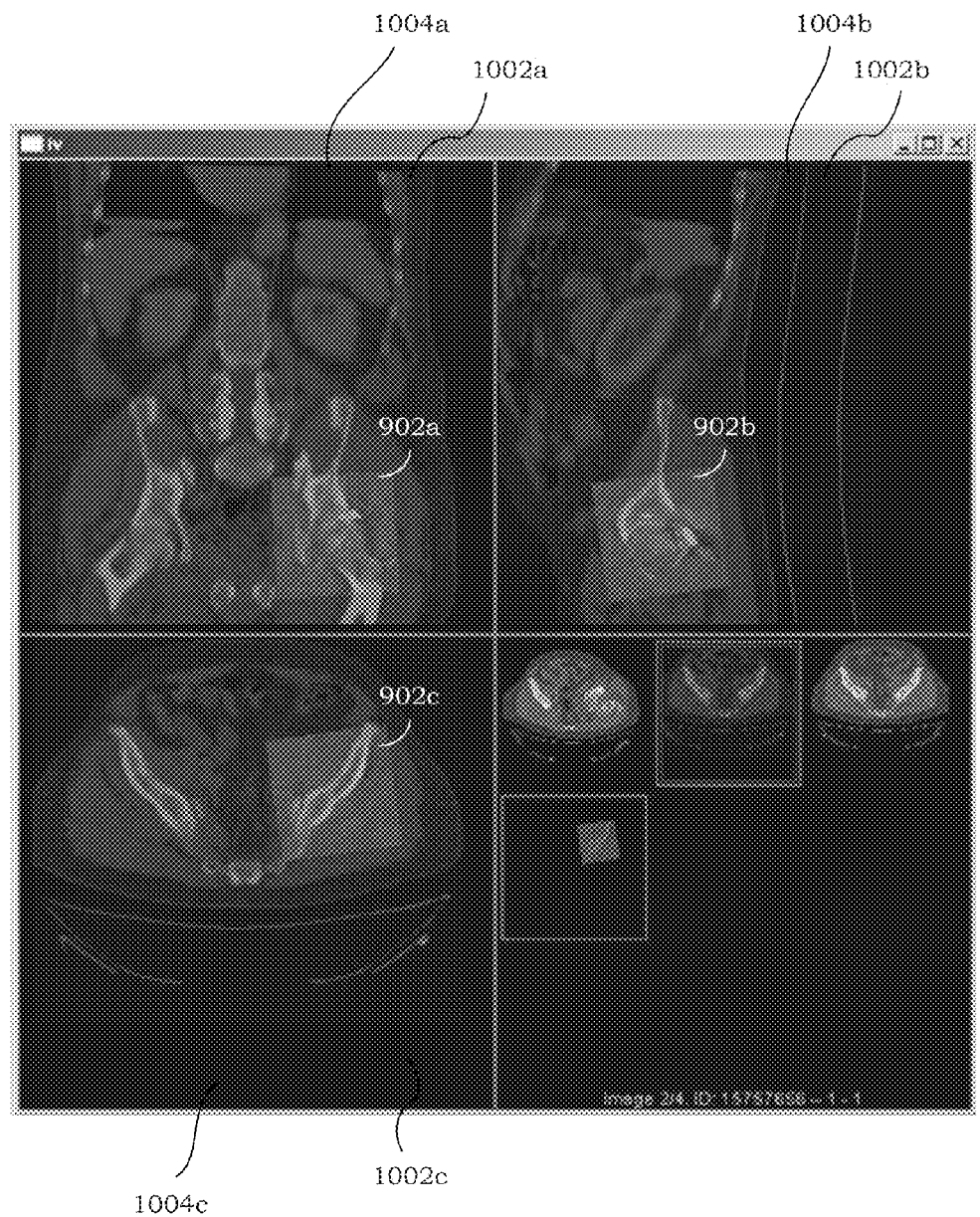
FIG. 10 shows exemplary first fused images.

Referring back to FIG. 2, at 214, the registered intra-operative image is digitally overlaid on the target region of the pre-operative image to form the first fused image. FIG. 10 shows exemplary first fused images 1002a-c. As shown, the registered intra-operative images 902a-c are overlaid on the respective target regions of the pre-operative images. As a result of the prior registration step 212, the anatomical structure in each of the intra-operative images 902a-c is substantially aligned with the anatomical structure in each of the pre-operative images.

In some implementations, the surgeon or user can manipulate the fused images 1002a-c on-screen to view them from substantially any desired angle or perspective, such as coronal plane view 1002a, sagittal plane view 1002b, and axial plane view 1002c. The first fused images 1002a-c advantageously allow the surgeon or user to determine, for example, which part of the anatomical structure (as captured in the pre-operative image) is being operated on. The surgeon or user may also compare the target region and the region of interest to evaluate the quality of the intervention. For example, the surgeon or user can observe whether the reconstructed structure (as captured by the intra-operative image) is positioned as desired and correctly oriented within the anchoring anatomy.

In some implementations, flipped and non-flipped views of the first fused image are alternately displayed so as to generate a "flashing" visualization of any intra-operative asymmetries. Such alternate displaying of flipped and non-flipped first fused images results in a flickering or flashing pattern of any asymmetries that are not corrected by the surgical intervention (e.g., reconstruction). This allows the surgeon or user to evaluate the quality of the surgical intervention (i.e. address the question of "how did I do?") and identify any problems, even subtle ones.

To generate the flipped view of the first fused image, a similarity transformation is performed on the image. The similarity transformation may include, for example, a reflection (or flip) operation over the image plane of symmetry. Other types of geometric transformations (e.g., scaling, translation, rotation, etc.) may also be applied. For example, in the case of rotational symmetry, the transformation may include a rotation about a point or axis of symmetry. The transformed (or flipped) first fused image may be continuously and alternately displayed with the original non-transformed (or non-flipped) first fused image within a display area (hereinafter "alternate display area"). For example, in FIG. 10, the flipped image and the original non-flipped first fused image 1002a may be continuously and alternately displayed within the display area 1004a. Similarly, the sagittal and axial views of the flipped image and the original non-flipped first fused image may be continuously and alternately displayed within the respective display areas 1004b-c.

Referring back to FIG. 2, at 216, the system 100 reflects the registered intra-operative image about the image plane (or line) of symmetry. The reflected registered intra-operative image is in alignment with the symmetric region in the pre-operative image.

At 218, the reflected registered intra-operative image is digitally overlaid on the symmetric region of the pre-operative image to form the second fused image. As discussed previously, the symmetric region is presumably the "healthy" or "normal" side of the anatomical structure, and it may serve as a reference to evaluate the surgical intervention on the region of interest. Such overlaying of the reflected registered intra-operative image on the symmetric region may be continuously or interactively switched on and off to highlight any differences between the images. In other words, the second fused image and the non-overlaid straightened pre-operative image may be alternately displayed within an alternate display area.

Figure 11:
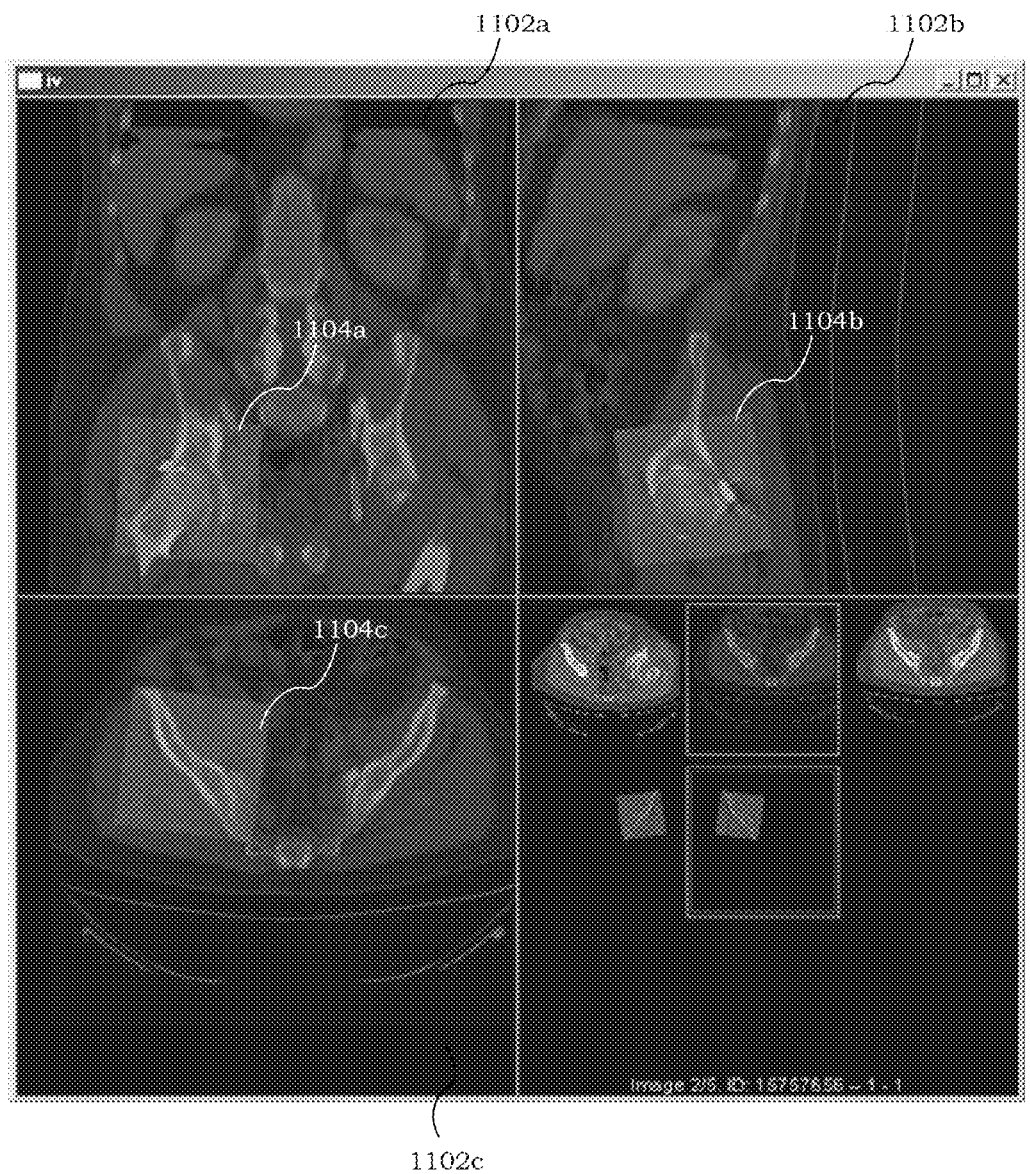
FIG. 11 shows exemplary second fused images.

FIG. 11 shows exemplary second fused images 1102a-c. As shown, the reflected registered intra-operative images 1104a-c are overlaid on the respective symmetric regions of the pre-operative images. In some implementations, the surgeon or user can manipulate the fused images 1102a-c on-screen to view them from substantially any desired angle or perspective, such as coronal plane view 1102a, sagittal plane view 1102b, and axial plane view 1102c.

In some implementations, a quantitative assessment is automatically performed based on the second fused image. The second fused image advantageously allows the surgeon or user to use the symmetric region as a reference to evaluate the quality of the surgical intervention. Any differences between the symmetric region and the region of interest may be quantitatively assessed or measured based on the second fused image. Quantitative assessment may include, for instance, measurement of angles, distances and/or size differences between the anatomical structure in the symmetric region and the anatomical structure in the region of interest. Such measurement data may be automatically compared to previously processed measurement values of reference anatomies stored in a database. Such comparison may reveal any abnormality in the particular anatomy of the current subject, as compared to reference anatomies of other subjects.

While the present invention has been described in detail with reference to exemplary embodiments, those skilled in the art will appreciate that various modifications and substitutions can be made thereto without departing from the spirit and scope of the invention as set forth in the appended claims. For example, elements and/or features of different exemplary embodiments may be combined with each other and/or substituted for each other within the scope of this disclosure and appended claims.

The invention claimed is:

1. A computer-implemented method of visualization, comprising:
   (i) receiving at least one pre-operative image and at least one intra-operative image of an anatomical structure;
   (ii) straightening the pre-operative image to generate a straightened pre-operative image;
   (iii) identifying a region of interest in the intra-operative image;
   (iv) identifying a symmetric region in the straightened pre-operative image based on the intra-operative image, wherein the symmetric region is substantially symmetrical to a target region in the straightened pre-operative image, wherein the target region corresponds to the region of interest in the intra-operative image;
   (v) extracting the symmetric region from the pre-operative image and reflecting the extracted symmetric region to generate a reference image;
   (vi) rigidly registering the intra-operative image with the reference image to generate a registered intra-operative image; and
   (vii) overlaying the registered intra-operative image on the target region in the straightened pre-operative image to generate a first fused image.

2. The method of claim 1 further comprising acquiring the intra-operative image using a C-arm system.

3. The method of claim 1 wherein straightening the pre-operative image comprises iteratively transforming and registering the pre-operative image until an ideal plane of symmetry is substantially aligned with an image plane of symmetry associated with the pre-operative image.

4. The method of claim 3 wherein transforming the pre-operative image comprises performing a reflection of the pre-operative image about the image plane of symmetry.

5. The method of claim 1 further comprising continuously and alternately displaying flipped and non-flipped views of the straightened pre-operative image within an alternate display area.

6. The method of claim 1 wherein identifying the region of interest in the intra-operative image comprises performing a pattern recognition technique.

7. The method of claim 1 further comprising identifying the target region by performing a landmarking technique.

8. The method of claim 1 wherein identifying the symmetric region comprises performing a landmarking technique.

9. The method of claim 1 further comprising continuously and alternately displaying flipped and non-flipped views of the first fused image within an alternate display area.

10. The method of claim 1 further comprising:
    reflecting the registered intra-operative image to generate a reflected intra-operative image; and
    overlaying the reflected intra-operative image on the symmetric region of the straightened pre-operative image to generate a second fused image.

11. The method of claim 10 further comprising continuously and alternately displaying the second fused image and the straightened pre-operative image within an alternate display area.

12. The method of claim 10 further comprising automatically performing a quantitative assessment based on the second fused image.

13. The method of claim 12 wherein automatically performing the quantitative assessment comprises generating measurement data by measuring angles, distances or size differences between the anatomical structure in the symmetric region and the anatomical structure in the region of interest.

14. A computer-implemented method of visualization, comprising:
    receiving at least one pre-operative image and at least one intra-operative image of an anatomical structure;
    straightening the pre-operative image to generate a straightened pre-operative image;
    identifying a region of interest in the intra-operative image;
    identifying a symmetric region in the straightened pre-operative image based on the intra-operative image, wherein the symmetric region is substantially symmetrical to the region of interest;
    extracting the symmetric region from the pre-operative image and reflecting the extracted symmetric region to generate a reference image;
    rigidly registering the intra-operative image with the reference image to generate a registered intra-operative image;
    reflecting the registered intra-operative image to generate a reflected intra-operative image; and
    overlaying the reflected intra-operative image on the symmetric region of the straightened pre-operative image to generate a fused image.

15. The method of claim 14 further comprising performing a quantitative assessment based on the fused image.

16. The method of claim 15 wherein automatically performing the quantitative assessment comprises generating measurement data by measuring angles, distances or size differences between the anatomical structure in the symmetric region and the anatomical structure in the region of interest.

17. A non-transitory computer-readable medium embodying a program of instructions executable by machine to perform steps for visualization, the steps comprising:
    (i) receiving at least one pre-operative image and at least one intra-operative image of an anatomical structure;
    (ii) straightening the pre-operative image to generate a straightened pre-operative image;
    (iii) identifying a region of interest in the intra-operative image;
    (iv) identifying a symmetric region in the straightened pre-operative image based on the intra-operative image, wherein the symmetric region is substantially symmetrical to a target region in the straightened pre-operative image, wherein the target region corresponds to the region of interest in the intra-operative image;
    (v) extracting the symmetric region from the pre-operative image and reflecting the extracted symmetric region to generate a reference image;
    (vi) rigidly registering the intra-operative image with the reference image to generate a registered intra-operative image; and
    (vii) overlaying the registered intra-operative image on the target region in the straightened pre-operative image to generate a first fused image.

18. The non-transitory computer-readable medium of claim 17 wherein the steps further comprise:
   reflecting the registered intra-operative image to generate a reflected intra-operative image; and
   overlaying the reflected intra-operative image on the symmetric region of the straightened pre-operative image to generate a second fused image.

19. A visualization system, comprising:
   a non-transitory memory device for storing computer-readable program code; and
   a processor in communication with the memory device, the processor being operative with the computer-readable program code to perform steps for visualization, the steps comprising
   (i) receiving at least one pre-operative image and at least one intra-operative image of an anatomical structure,
   (ii) straightening the pre-operative image to generate a straightened pre-operative image,
   (iii) identifying a region of interest in the intra-operative image,
   (iv) identifying a symmetric region in the straightened pre-operative image based on the intra-operative image, wherein the symmetric region is substantially symmetrical to a target region in the straightened pre-operative image, wherein the target region corresponds to the region of interest in the intra-operative image,
   (v) extracting the symmetric region from the pre-operative image and reflecting the extracted symmetric region to generate a reference image,
   (vi) rigidly registering the intra-operative image with the reference image to generate a registered intra-operative image, and
   (vii) overlaying the registered intra-operative image on the target region in the straightened pre-operative image to generate a first fused image.

20. The system of claim 19, wherein the steps further comprise:
   reflecting the registered intra-operative image to generate a reflected intra-operative image; and
   overlaying the reflected intra-operative image on the symmetric region of the straightened pre-operative image to generate a second fused image.

* * * * *